(12) United States Patent
Li et al.

(10) Patent No.: US 12,086,704 B2
(45) Date of Patent: Sep. 10, 2024

(54) MACHINE LEARNING MODEL WITH DEPTH PROCESSING UNITS

(71) Applicant: Microsoft Technology Licensing, LLC, Redmond, WA (US)

(72) Inventors: Jinyu Li, Redmond, WA (US); Liang Lu, Redmond, WA (US); Changliang Liu, Bothell, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 496 days.

(21) Appl. No.: 17/518,535

(22) Filed: Nov. 3, 2021

(65) Prior Publication Data

US 2022/0058442 A1 Feb. 24, 2022

Related U.S. Application Data

(62) Division of application No. 16/206,714, filed on Nov. 30, 2018, now Pat. No. 11,210,565.

(51) Int. Cl.
*G06N 3/08* (2023.01)
*G06F 18/21* (2023.01)
(Continued)

(52) U.S. Cl.
CPC .......... *G06N 3/048* (2023.01); *G06F 18/217* (2023.01); *G06N 3/08* (2013.01); *G06N 20/00* (2019.01); *G10L 15/063* (2013.01); *G10L 15/16* (2013.01)

(58) Field of Classification Search
CPC .......... G06N 3/048; G06N 20/00; G06N 3/08; G06F 18/217; G10L 15/063; G10L 15/16
See application file for complete search history.

(56) References Cited

U.S. PATENT DOCUMENTS 9,239,828 B2 * 1/2016 Yao .................. G06F 40/30
9,263,036 B1 * 2/2016 Graves .................. G10L 15/16
(Continued)

OTHER PUBLICATIONS

Dong Yu, et al., "Roles of pre-training and fine-tuning in context-dependent dbn-hmms for real-world speech recognition", In NIPS 2010 Workshop on Deep Learning and Unsupervised Feature Learning, 2010.
(Continued)

*Primary Examiner* — Shaghayegh Azima
(74) *Attorney, Agent, or Firm* — CALFEE, HALTER & GRISWOLD LLP

(57) ABSTRACT

Representative embodiments disclose machine learning classifiers used in scenarios such as speech recognition, image captioning, machine translation, or other sequence-to-sequence embodiments. The machine learning classifiers have a plurality of time layers, each layer having a time processing block and a depth processing block. The time processing block is a recurrent neural network such as a Long Short Term Memory (LSTM) network. The depth processing blocks can be an LSTM network, a gated Deep Neural Network (DNN) or a maxout DNN. The depth processing blocks account for the hidden states of each time layer and uses summarized layer information for final input signal feature classification. An attention layer can also be used between the top depth processing block and the output layer.

20 Claims, 11 Drawing Sheets

(51) Int. Cl.
*G06N 3/048* (2023.01)
*G06N 20/00* (2019.01)
*G10L 15/06* (2013.01)
*G10L 15/16* (2006.01)

(56) References Cited

U.S. PATENT DOCUMENTS

| | | | |
|---|---|---|---|
| 10,741,169 B1* | 8/2020 | Trueba | G10L 13/02 |
| 10,878,837 B1* | 12/2020 | Guo | G06V 20/00 |
| 10,891,951 B2* | 1/2021 | Scaria | G10L 15/16 |
| 2015/0066496 A1* | 3/2015 | Deoras | G10L 15/16 |
| | | | 704/232 |
| 2016/0335536 A1* | 11/2016 | Yamazaki | G06N 3/045 |
| 2017/0300812 A1* | 10/2017 | Ohsawa | G06N 3/08 |
| 2018/0174036 A1* | 6/2018 | Han | G06N 3/082 |
| 2018/0174576 A1* | 6/2018 | Soltau | G10L 15/02 |
| 2018/0247199 A1* | 8/2018 | Cox | G06N 3/084 |
| 2018/0300317 A1 | 10/2018 | Bradbury | |
| 2018/0308487 A1* | 10/2018 | Goel | G10L 15/1815 |
| 2018/0336884 A1* | 11/2018 | Sriram | G06N 3/044 |
| 2018/0336888 A1* | 11/2018 | Jiang | G10L 15/063 |
| 2018/0336889 A1* | 11/2018 | Li | G10L 15/16 |
| 2019/0088251 A1* | 3/2019 | Mun | G10L 15/083 |
| 2019/0324781 A1* | 10/2019 | Ramamurthy | G06F 18/24 |
| 2019/0377797 A1* | 12/2019 | Liu | G06N 3/08 |
| 2020/0126544 A1* | 4/2020 | Scaria | G10L 15/22 |
| 2020/0175335 A1 | 6/2020 | Li et al. | |
| 2021/0248514 A1* | 8/2021 | Cella | G06V 20/20 |

OTHER PUBLICATIONS

Sainath, et al., " Making deep belief networks effective for large vocabulary continuous speech recognition", In Proc. ASRU, 2011, pp. 30-35.
Jaitly, et al., "Application of pretrained deep neural networks to large vocabulary speech recognition", In Proc. Interspeech, 2012.
Hinton, et al., "Deep neural networks for acoustic modeling in speech recognition: The shared views of four research groups", In IEEE Signal Processing Magazine, vol. 29, No. 6, pp. 82-97, 2012.
Deng, et al., "Recent advances in deep learning for speech research at Microsoft", In Acoustics, Speech and Signal Processing (ICASSP), In IEEE International Conference, 2013, pp. 8604-8608.
Hochreiter, et al., "Long short-term memory", In Neural Computation, vol. 9, No. 8, pp. 1735-1780, 1997.
Graves, et al., "Speech recognition with deep recurrent neural networks", In ICASSP, 2013, pp. 6645-6649.
Sak, et al., "Long short-term memory recurrent neural network architectures for large scale acoustic modeling", In Proc. Interspeech, 2014, pp. 338-342.
Sak, H., "Sequence discriminative distributed training of long short-term memory recurrent neural networks", In Fifteenth annual conference of the international speech communication association, 2014.
Li, et al., "Constructing long short-term memory based deep recurrent neural networks for large vocabulary speech recognition", In arXiv:1410.4281v2 [cs.CL], May 11, 2015.
Miao, et al., "On speaker adaptation of long shortterm memory recurrent neural networks", In Proc. Interspeech, 2015, pp. 1101-1105.
Miao, et al., "Simplifying long short-term memory acoustic models for fast training and decoding", In ICASSP, 2016.
Sainath, et al., "Convolutional, long short-term memory, fully connected deep neural networks", In Acoustics, Speech, and Signal Processing (ICASSP), In 2015 IEEE International Conference on IEEE, 2015, pp. 4580-4584.
Li, et al., "LSTM time and frequency recurrence for automatic speech recognition", In ASRU, 2015.
Li, et al., "Exploring multidimensional LSTMs for large vocabulary ASR", In ICASSP, 2016.

Sainath, et al., "Modeling time-frequency patterns with LSTM vs. convolutional architectures for LVCSR tasks", In Proc. Interspeech, 2016.
Li, et al., "Reducing the computational complexity of two-dimensional LSTMs", In Proc. Interspeech, 2017.
Yu, et al., "Recent progresses in deep learning based acoustic models", In IEEE J. of Autom. Sinica., vol. 4, No. 3, pp. 399-412, Jul. 2017.
Zhang, et al., "Highway long short-term memory rnns for distant speech recognition", In ICASSP, 2016.
Hsu, et al., "A prioritized grid long short-term memory RNN for speech recognition", In Spoken Language Technology Workshop (SLT), 2016, pp. 467-473.
Zhao, et al., "Multidimensional residual learning based on recurrent neural networks for acoustic modeling", In Proc. Interspeech, 2016, pp. 3419-3423.
Kim, et al., "Residual LSTM: Design of a deep recurrent architecture for distant speech recognition", In arXiv preprint arXiv:1701.03360, 2017.
Pundak, et al., "Highway-LSTM and recurrent highway networks for speech recognition", In Proc. of Interspeech, 2017.
Li, et al., "Layer trajectory LSTM", In Proc. of Interspeech, 2018.
Kalchbrenner, N., "Grid long short-term memory", In arXiv preprint arXiv:1507.01526, 2015.
Najafian, et al., "Automatic speech recognition of Arabic multi-genre broadcast media", In Automatic Speech Recognition and Understanding Workshop (ASRU), 2017, pp. 353-359.
Kingsbury, et al., "Scalable minimum bayes risk training of deep neural network acoustic models using distributed hessian-free optimization", In Thirteenth Annual Conference of the International Speech Communication Association, 2012.
Vesely, et al., "Sequence-discriminative training of deep neural networks", In Interspeech, 2013, pp. 2345-2349.
Su, et al., "Error back propagation for sequence training of context-dependent deep networks for conversational speech transcription", In Acoustics, Speech and Signal Processing (ICASSP), 2013, pp. 6664-6668.
Bahdanau, et al., "Neural machine translation by jointly learning to align and translate", In arXiv preprint arXiv:1409.0473, 2014.
Das, et al., "Advancing connectionist temporal classification with attention modeling", In Proc. ICASSP, 2018.
Xue, et al., "Restructuring of deep neural network acoustic models with singular value decomposition", In Proc. Interspeech, 2013, pp. 2365-2369.
He, et al., "Deep residual learning for image recognition", In arXiv preprint arXiv:1512.03385, 2015.
Goodfellow, et al., "Maxout networks", In arXiv preprint arXiv:1302.4389, 2013.
Miao, et al., "Deep maxout networks for low-resource speech recognition", In Automatic Speech Recognition and Understanding (ASRU), 2013, pp. 398-403.
Swietojanski, et al., "Investigation of maxout networks for speech recognition", In Acoustics, Speech and Signal Processing (ICASSP), 2014, pp. 7649-7653.
Li, et al., "Developing far-field speaker system via teacher-student learning", In Proc. ICASSP, 2018.
"Preliminary Amendment for U.S. Appl. No. 16/206,714", Filed Date: Sep. 4, 2019, 3 Pages.
Dyer, et al., "Recurrent Neural Network Grammars", In repository of arXiv:1602.07776v4, Oct. 12, 2016, 13 Pages.
Ferrer, et al., "Study of Senone-Based Deep Neural Network Approaches for Spoken Language Recognition", In Journal of IEEE/ACM Transactions on Audio, Speech and Language Processing, vol. 24, Issue 1, Jan. 1, 2016, pp. 1-12.
"International Search Report and Written Opinion Issued in PCT Application No. PCT/US2019/062712", Mailed Date: May 11, 2020, 12 Pages.
"Restriction Requirement for U.S. Appl. No. 16/206,714", Mailed Date: Oct. 20, 2020, 8 Pages.
"Reply to Restriction Requirement for U.S. Appl. No. 16/206,714", Filed Date: Dec. 21, 2020, 2 Pages.

(56) References Cited

OTHER PUBLICATIONS

Graves, et al., "Speech recognition with deep recurrent neural networks", In 2013 IEEE International Conference on Acoustics, Speech and Signal Processing, 2013, pp. 6645-6649.
Xu, et al., "An Intrusion Detection System Using a Deep Neural Network With Gated Recurrent Units", In IEEE Access, vol. 6, 2018, pp. 48697-48707.
"Non-Final Office Action for U.S. Appl. No. 16/206,714", Mailed Date: Jan. 28, 2021, 14 Pages.
"Reply to Non-Final Office Action for U.S. Appl. No. 16/206,714", Filed Date: Jun. 28, 2021, 14 Pages.
Sainath, et al., "Modeling Time-Frequency Patterns with LSTM vs. Convolutional Architectures for LVCSR Task", Google Inc., 2016, 5 Pages.
"Notice of Allowance and Fees Due for U.S. Appl. No. 16/206,714", Mailed Date: Aug. 19, 2021, 17 Pages.

* cited by examiner

MACHINE LEARNING MODEL WITH DEPTH PROCESSING UNITS

RELATED APPLICATION

This application is a divisional of U.S. patent application Ser. No. 16/206,714, filed on Nov. 30, 2018, and entitled "MACHINE LEARNING MODEL WITH DEPTH PROCESSING UNITS". The entirety of this application is incorporated herein by reference.

FIELD

This application relates generally to machine learning models and in particular machine learning models with depth processing units. Such machine learning models can be applied to speech recognition, image recognition, image caption generation, machine translation, and other sequence to sequence or classification problems.

BACKGROUND

It is popular to stack recurrent neural network machine learning models, like Long Short Term Memory (LSTM) models in layers to get better modeling power. However, an LSTM Recurrent Neural Network (RNN) with too many layers becomes very hard to train and the so called gradient vanishing issue exists if the layers go too deep. Attempts have been made to solve these issues using skip connections between layers, such as residual LSTM.

It is within this context that the present embodiments arise.

DETAILED DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Embodiments of the present disclosure present mechanisms for machine learning that can be used in a variety of contexts. The mechanisms disclosed herein can be used for classification and, when combined with other aspects, become part of a system that performs sequence to sequence conversion such as speech recognition, image captioning, machine translation, and so forth. The mechanisms can also be used in any context where classification is a part of the problem to be solved.

Embodiments of the present disclosure solve the technical problems associated with time-layered LSTM models by adding a layer processing block between the LSTM layers. The layer processing block scans the outputs from the time layers and uses the summarized layer information for final classification. The forward-propagation of time-layered LSTMs and the layer processing block can bn handled in two separate threads in parallel.

Test data has shown that significant increases in accuracy can be achieved using this architecture. However, depending upon the implementation of the layer processing blocks, runtime costs (computational, memory, etc.) can be high. Adjusting the implementation of the layer processing blocks can reduce the runtime costs. The layer processing blocks can be implemented using recurrent neural networks, such as LSTM networks, gated Deep Neural Networks (DNN), or maxout DNN.

An attention layer can be used before the output layer. The attention layer can further increase classification accuracy.

DESCRIPTION

Figure 1:
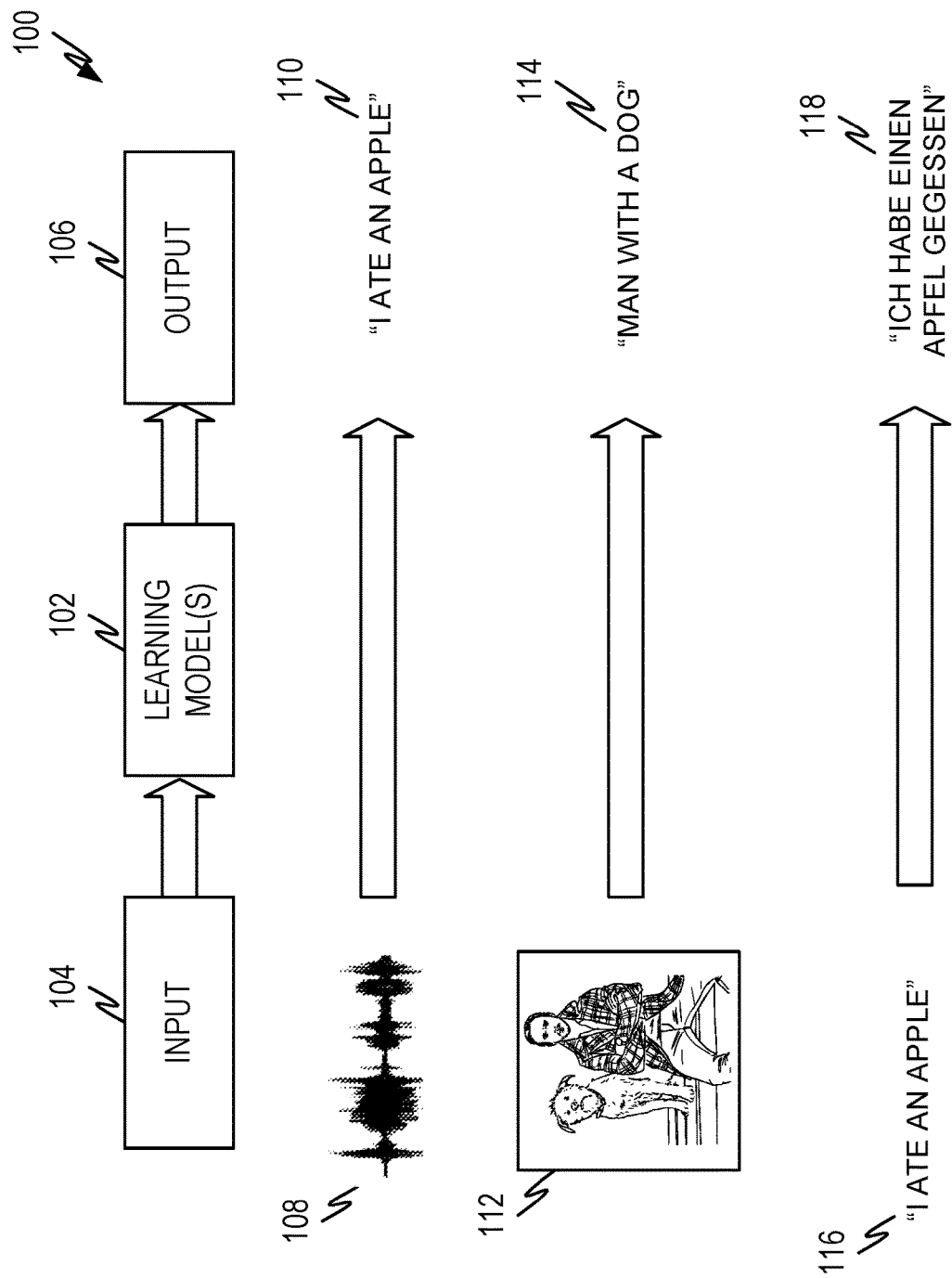
FIG. 1 illustrates an example environment where machine learning models according to aspects of the present disclosure can be utilized.

FIG. 1 illustrates an example environment where machine learning models according to aspects of the present disclosure can be utilized. The representative examples in FIG. 1 all relate to converting some sort of an input sequence to an output sequence, although as will become evident from this disclosure, the embodiments of the present disclosure can be used in any context involving classification.

A high level architecture 100 includes an input signal 104, a system 102 that includes one or more machine learning models, including those disclosed herein. The system 102 produces an output 106. In the speech recognition context, which is used in this disclosure as a representative example context, an input speech signal 108 is recognized and put into an output format 110, such as text. In another representative context of image captioning, an image 112 is input and the system produces a caption 114 describing the contents of the image. In yet another context of machine translation, an input 116 in one language is input and the system produces an output 118 in a second language. In still another context of handwriting recognition (not illustrated), the input is a time varying signal captured by a digitizer or other input device and the system produces textual or command output corresponding to the recognized handwriting. In still another context of audio recognition (not illustrated), the input is a time varying signal captured by a microphone or is some other audio signal that is to be recognized. The output can vary depending on the exact audio recognition problem. For example, one audio recognition problem may be to recognize the title or other information about a song represented in the audio signal. In another example, the audio recognition problem may be to identify a speaker in the audio signal. In another example, the audio recognition problem may be to recognize an instrument or other audio source represented in the audio signal.

Numerous other contexts will be evident to those of skill in the art.

Figure 2:
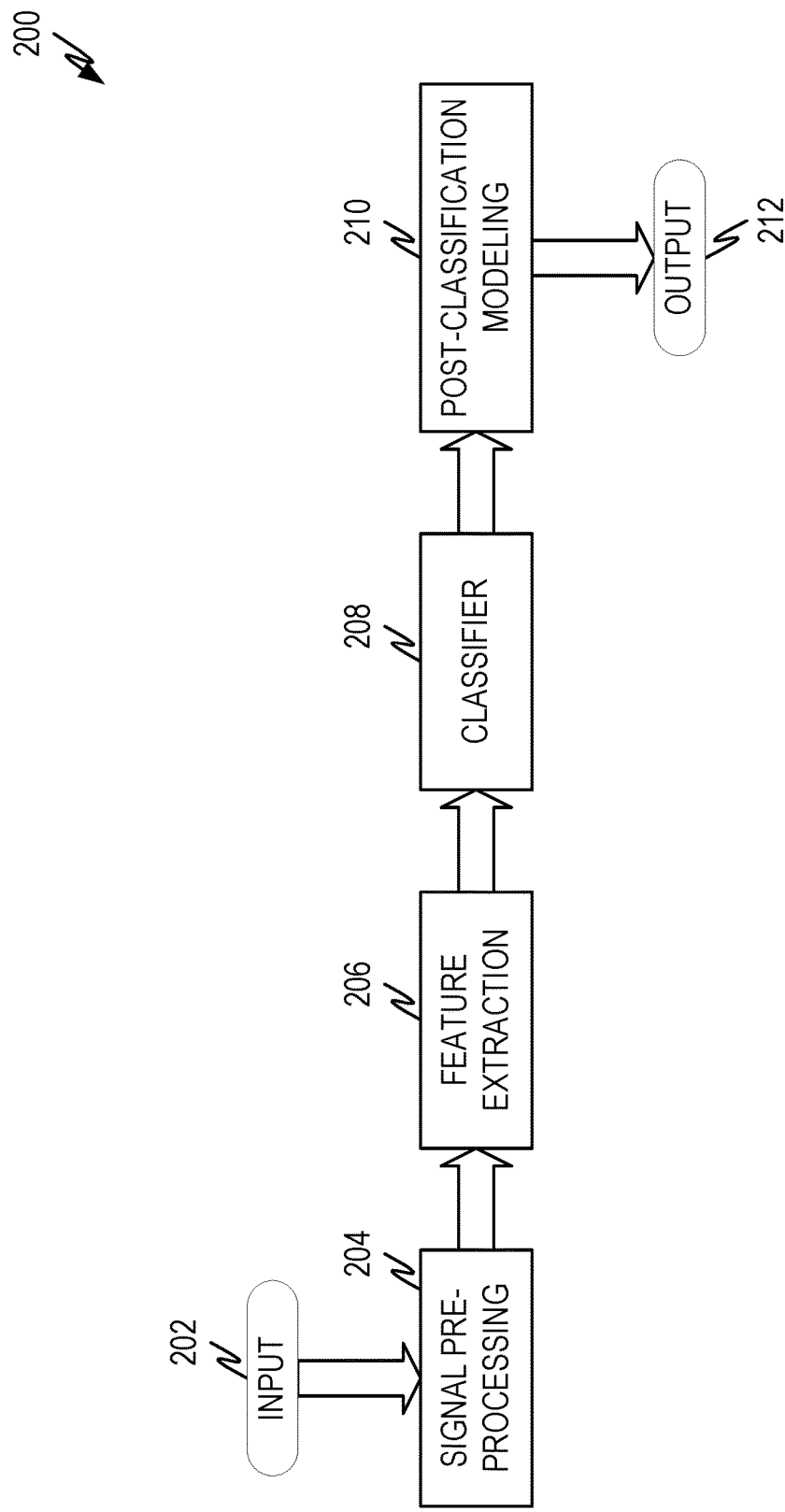
FIG. 2 illustrates a representative architecture according to some aspects of the present disclosure.

FIG. 2 illustrates a representative architecture 200 according to some aspects of the present disclosure. This architecture is a generalization of an architecture that can solve problems that have classification as part of the solution. For example, image recognition or captioning, speech recognition, machine translation, handwriting recognition, music recognition, text or document recognition or classification, and numerous other technical problems.

The general architecture 200 receives an input 202 of the appropriate type, such as text, speech, handwriting, audio, video and so forth. In some embodiments, signal pre-processing 204 may help improve the accuracy or effectiveness of the solution. For example, audio collected in a particular environment may benefit from noise reduction, level equalization, or other pre-processing prior to (or as part of) recognition. Thus, block 204 can represent any desired pre-processing that occurs to the input 202 prior to further processing.

Once any desired preprocessing occurs, the signal is input into feature extractor 206. Feature extractor 206 is designed to extract features that will be classified by classifier 208. For a time based signal, such as handwriting or audio (e.g., speech), feature extractor 206 may comprise nothing more than sampling the time based signals to break it up into chunks that can be further processed in a time layer of the classifier. With an input such as an image, the feature extractor 206 can be one or more convolutional layers that extract features from the image. Other trained machine learning models can be part of the feature extractor 206 depending on the input 202. Thus, there are various types of feature extractors 206 depending on the input 202. For example, if the input is image data, then the feature extractor 206 can be one or more convolutional networks. For handwriting analysis, speech recognition, or other time varying input, the feature extractor can be a machine learning model that breaks the input signal into appropriate chunks and creates feature vectors for classification.

Classifier 208 classifies the features to identify them. The output of the classifier 208 are referred to herein as classified posteriors. The classifier 208 has various embodiments that are presented below that comprise machine learning models.

Once features are classified by classifier 208, the features may be subject to further post-classification modeling using one or more machine learning models, or other types of models. For example, as explained below, for the problem of speech recognition, the classifier 208 can be used to classify senones or other parts of speech. Afterward, language modeling may be used to identify likely words from senones and likely phrases from words. Other types of problems may use other post-classification modeling to produce the most likely output 212 from the classified posteriors.

Figure 3:
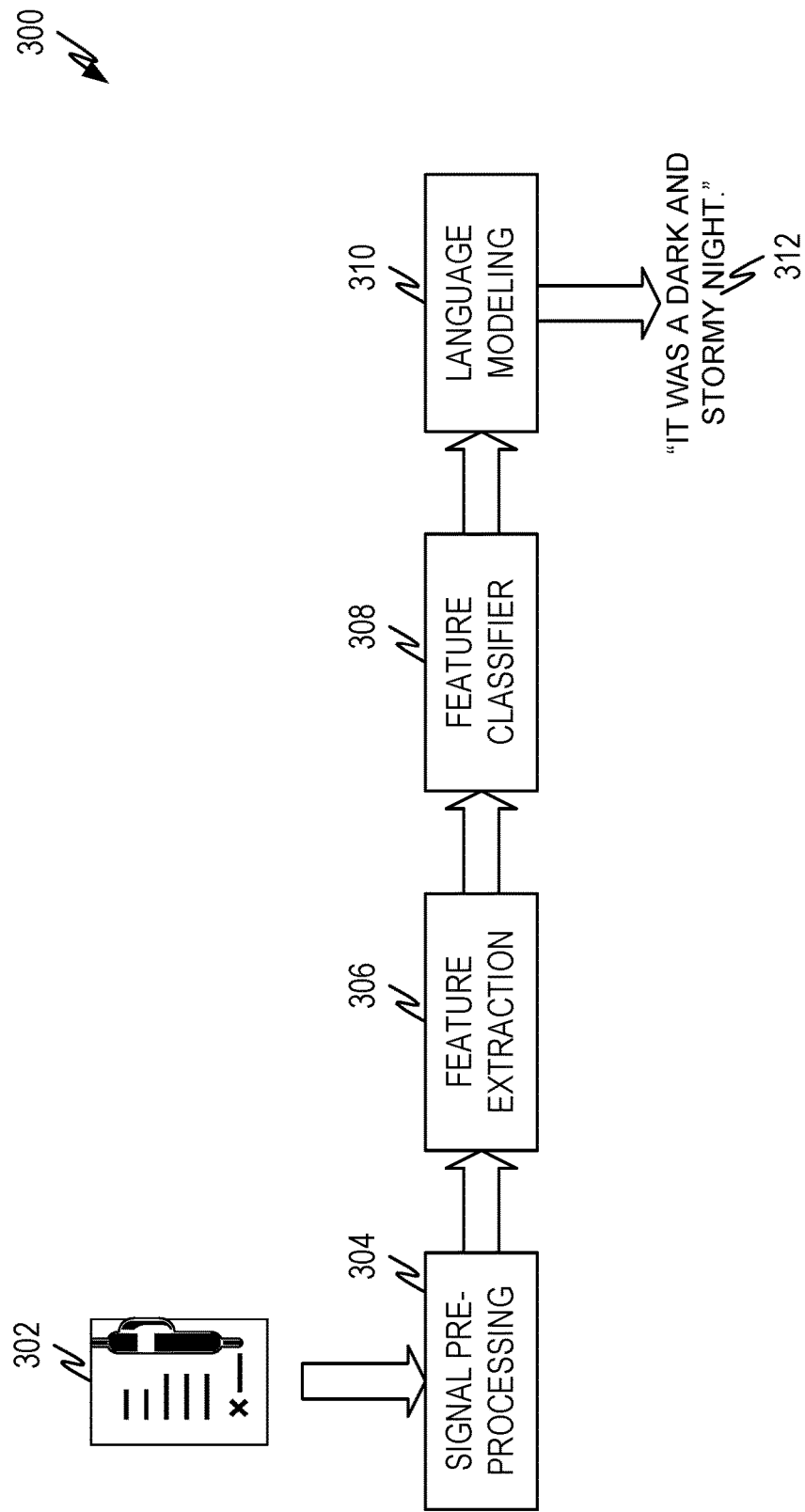
FIG. 3 illustrates a representative architecture for image captioning according to some aspects of the present disclosure.

FIG. 3 illustrates a representative architecture 300 for handwriting recognition according to some aspects of the present disclosure. This architecture shows how the general architecture 200 of FIG. 2 may find implementation to the particular context of handwriting recognition. In handwriting recognition, the problem is to identify what a user is writing and produce corresponding text.

In the particular example of FIG. 3, the handwriting input 302 is typically captured as a time signal as a user forms letters and words by a digitizer or other input device. The handwriting input 302 can have desired pre-processing (if any) performed by signal pre-processor 304. Feature extractor 306 can comprise one or more convolutional neural networks or other machine learning models that are designed to extract features from the input 302 for classification by feature classifier 308. Such feature extractors are known in the art.

Feature classifier 308 can comprise one of the classification networks described below. The output of the feature classifier 308 can be input into a language model 310 in order to create a caption 312 from the classified posteriors. Language models 310 are known and create a caption phrase from the classified posteriors.

Figure 4:
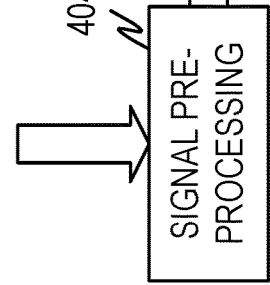
FIG. 4 illustrates a representative architecture for speech recognition according to some aspects of the present disclosure.

FIG. 4 illustrates a representative architecture 400 for speech recognition according to some aspects of the present disclosure. This architecture shows how the general architecture 200 of FIG. 2 may find implementation to the particular context of speech recognition. In speech, the problem is to convert spoken language to a textual representation of what was spoken.

The input speech 402 is pre-processed by signal pre-processor 404. Signal pre-processor is an optional operation and may not exist in all implementations. After any pre-processing is performed, the signal is sent to feature extractor 406 which breaks the speech up into utterances and creates a feature vector for senone classification. Senone classification is performed by classifier 408 and the output is used by a language modeler 410 in order to produce the output phrase 412. Language modeling 410 is often performed by a word hypothesis decoder along with a language model, as is known in the art.

Figure 5:
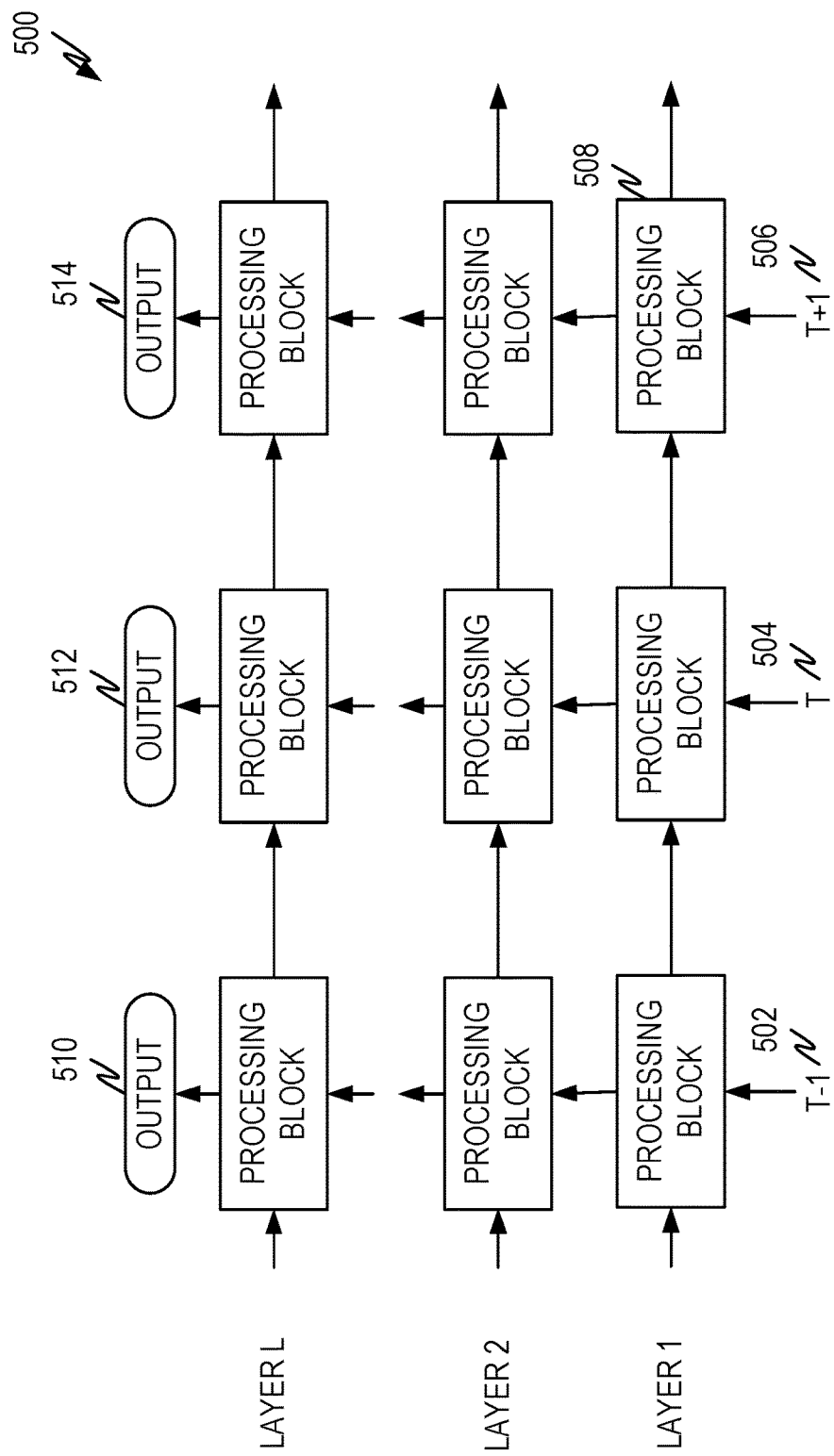
FIG. 5 illustrates a representative architecture for classification according to some aspects of the present disclosure.

FIG. 5 illustrates a representative architecture 500 for classification according to some aspects of the present disclosure. The architecture of the classification models can be expressed as a series of neural network processing blocks 508. Each processing block 508 comprises a time neural network unit and a layer neural network unit as discussed in greater detail below. Connecting the neural network processing blocks 508 in the grid architecture as illustrated yields a plurality of time layers (layer 1 . . . layer L) with the time neural network units modeling the time dimension (T−1, T, T+1, etc.). The output of the "top" layer (layer L) is fed into an output layer 510, 512, 514 such as a softmax or other output layer to obtain the final classification. Thus, at each time step the output is a function of the layer neural network units. More specifically, the layer neural network units (sometimes referred to as depth neural network units) scan the outputs from multiple time layers and use the summarized layer information for final classification, such as senone classification in the case of speech recognition. The idea is that the lower layer hidden states from the time neural network units may also carry valuable information for classification, and it may not be optimal to use only the hidden state of the final (top) layer (layer L) time neural network unit for classification as in the conventional practice. Furthermore, the layer neural network units also create auxiliary connections for time neural network units, which facilitates the gradient flow to help solve the problem of training deep (e.g., multiple layered) time neural network units. Thus, the layer processing block helps solve the vanishing gradient problem encountered when training deep time layered networks such as deep layered LSTM networks.

At each time step 502, 504, 506 the processing blocks are connected to the layer above and to the subsequent time step. The output (final classification) is the output of an output layer 510, 512, 514 driven by the output of the layer processing blocks.

Figure 6:
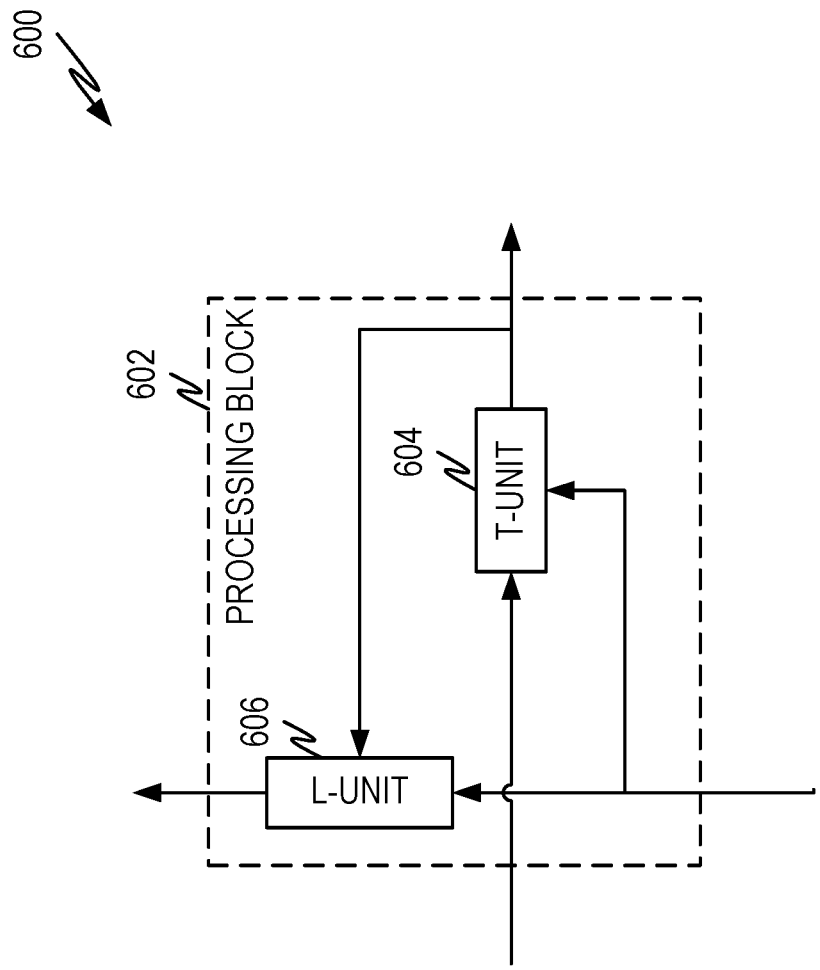
FIG. 6 illustrates a representative processing block according to some aspects of the present disclosure.

FIG. 6 illustrates a representative neural network processing block 600 according to some aspects of the present disclosure. The neural network processing block 602 represents the processing blocks of FIG. 5, for example and the processing blocks of the other embodiments disclosed herein. Each processing block 602 comprises a time neural network unit 604 and a layer neural network unit 606. The time units 604 make up the various time layers (e.g., layer 1 ... layer L of FIG. 5) and the layer units 606 make up the overall layer neural network processing unit, such as 710 and 712 of FIG. 7 or the collective layer neural network processing units of FIGS. 8-10.

The time recurrence modeling via the time neural network units 604 is decoupled from the classification via the layer neural network units 606 as discussed in greater detail below by virtue of the output of the layer neural network units not being fed into the time neural network units. The layer neural network units 606 scan the outputs from multiple time neural network units 604 and use the summarized layer information for final classification. The time units and layer units can be executed in parallel on different threads.

In the embodiments described herein the time neural network unit 604 is an LSTM network (either "regular" LSTM or residual LSTM as explained below), although other recurrent neural networks (RNN) or deep neural networks (DNN) could also be used. The layer neural network unit 606 can be implemented using LSTM networks (regular or residual), gated DNN, maxout DNN, or other deep or recurrent neural networks.

Figure 7:
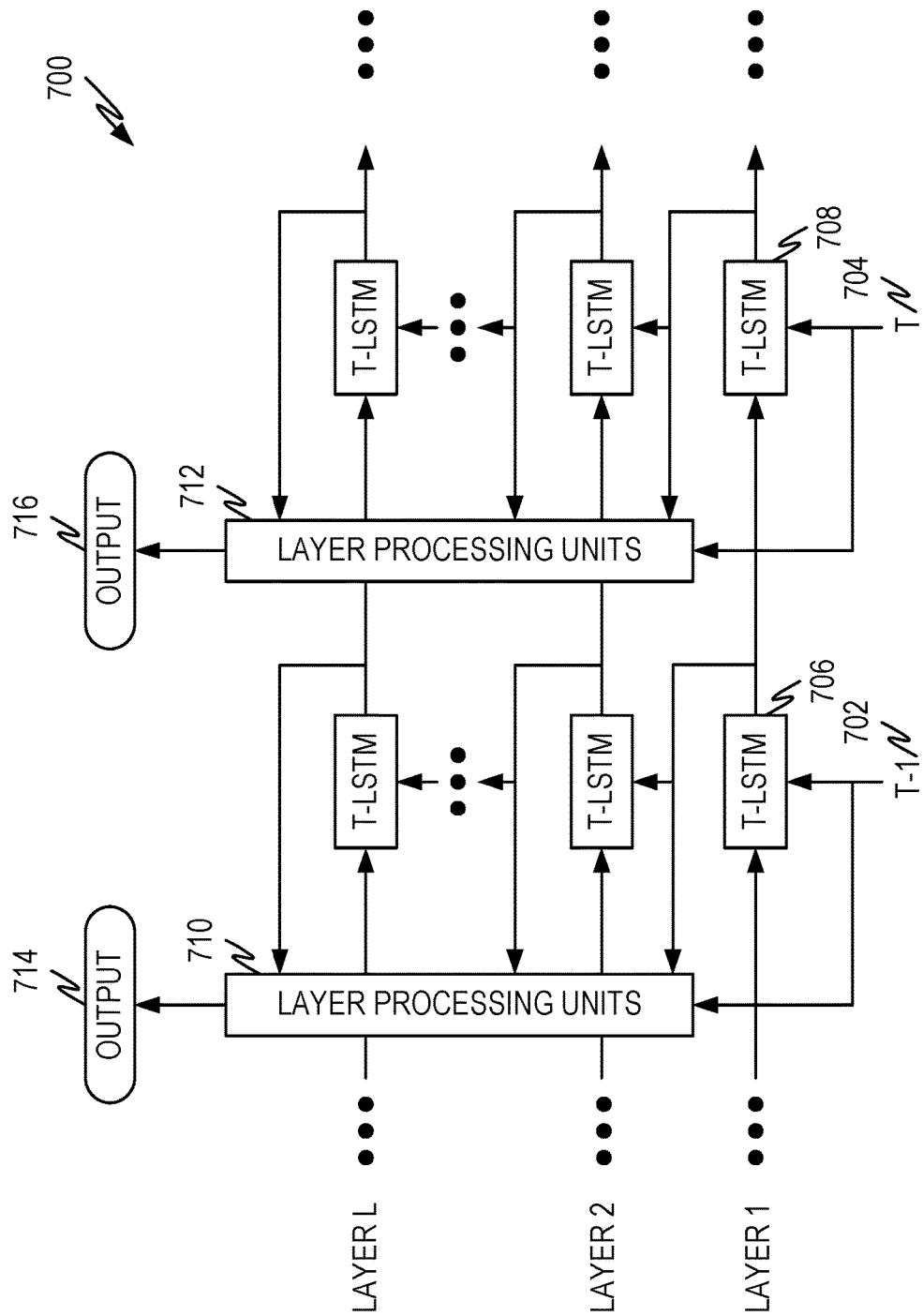
FIG. 7 illustrates a representative architecture for classification according to some aspects of the present disclosure.

FIG. 7 illustrates a representative architecture for classification according to some aspects of the present disclosure. This FIG. illustrates a time neural network unit that comprises LSTM networks (e.g., 706, 708) and a general representation of the layer neural network units 710 and 712, the output of which is coupled to an output layer 714, 716 such as a softmax or other output layer to obtain the final classification.

The time LSTM (e.g., 706, 708) does temporal modeling via time recurrence by taking the output of the previous time step as the input of the current time step. To increase the modeling power, multiple layers (layer 1, layer 2, ..., layer L) of LSTM blocks are stacked together to form a multiple layer LSTM. At time step t, the computation of the l-th layer LSTM block can be described as:

$$i_t^l = \sigma(W_{ix}^l x_t^l + W_{ih}^l h_{t-1}^l + p_i^l \odot c_{t-1}^l + b_i^l) \tag{1}$$

$$f_t^l = \sigma(W_{fx}^l x_t^l + W_{fh}^l h_{t-1}^l + p_f^l \odot c_{t-1}^l + b_f^l) \tag{2}$$

$$c_t^l = f_t^l \odot c_{t-1}^l + i_t^l \odot \phi(W_{cx}^l x_t^l + W_{ch}^l h_{t-1}^l + b_c^l) \tag{3}$$

$$o_t^l = \sigma(W_{ox}^l x_t^l + W_{oh}^l h_{t-1}^l + p_o^l \odot c_t^l + b_o^l) \tag{4}$$

$$h_t^l = o_t^l \odot \phi(c_t^l) \tag{5}$$

Where $x_t^l$ is the input vector for the l-th layer with $$x_t^l = \begin{cases} h_t^{l-1} & \text{if } l > 1 \\ s_t & \text{if } l = 1 \end{cases} \tag{6}$$

$s_t$ is the speech spectrum input at time step t. l=1 ... L, where L is the total number of hidden layers. The vectors $i_t^l$, $o_t^l$, $f_t^l$, $c_t^l$, are the activation of the input, output, forget gates, and memory cells, respectively. $W_{\cdot x}^l$ and $W_{\cdot h}^l$ are the weight matrices for the inputs $x_t^l$ and the recurrent inputs $h_{t-1}^l$, respectively. $b^l$. are the bias vectors. $p_i^l$, $p_o^l$, $p_f^l$, are parameter vectors associated with peephole connections. The functions $\sigma(\cdot)$ and $\phi(\cdot)$ are the logistic sigmoid and hyperbolic tangent nonlinearity, respectively. The operation $\odot$ represents element-wise multiplication vectors.

Residual LSTM is created by changing equation (6) above to equation (7) below. Residual LSTM can also be used in embodiments of the present disclosure either for time LSTM or layer LSTM $$x_t^l = \begin{cases} x_t^{l-1} + h_t^{l-1} & \text{if } l > 1 \\ s_t & \text{if } l = 1 \end{cases} \tag{7}$$

The layer neural network units 710, 712 have no time recurrence. The l-th layer output of the layer unit can be expressed as:

$$g_t^l = F(g_t^{l-1}, h_t^l | \theta_l) \tag{8}$$

Where $h_t^l$ is the hidden state from the l-th layer of time neural network unit at time step t, calculated from equation (5); $g_t^{l-1}$ denotes the output of the previous layer neural network unit, and where $g_t^0 = s_t \cdot F(\cdot | \theta_l)$ denotes the function to process the l-th layer in the layer neural network unit which is parameterized by $\theta_l$. In embodiments of the disclosure discussed below, the function $F(\cdot | \theta_l)$ is realized by LSTM, gated DNN, and maxout DNN units, although other realizations are within the scope of this disclosure. The various realizations allow selection of a desired implementation processing cost/error rate combination.

It can be worth noting that the output from the layer neural network unit is not fed onto the time neural network unit, which is a difference from other grid LSTM networks or variations thereof. This provides a technical benefit in that the layer processing unit is not involved in time recurrence modeling, which allows the disclosed architectures to be more adaptable, and easier to integrate different kinds of features into the network. In addition, the disclosed architecture lends itself to parallelization of the time neural network units and the layer neural network units because the forward-propagation of the time neural networks at the next time step is independent from the computation of the layer neural network unit at the current time step. Thus, forward-propagation of the time neural network unit and the layer neural network unit can be computed by two separate threads in parallel. As long as the computation cost of the layer neural network unit is not higher than the computational cost of the time neural network unit, the network inference time can be the same as a standard layered time neural network.

Figure 8:
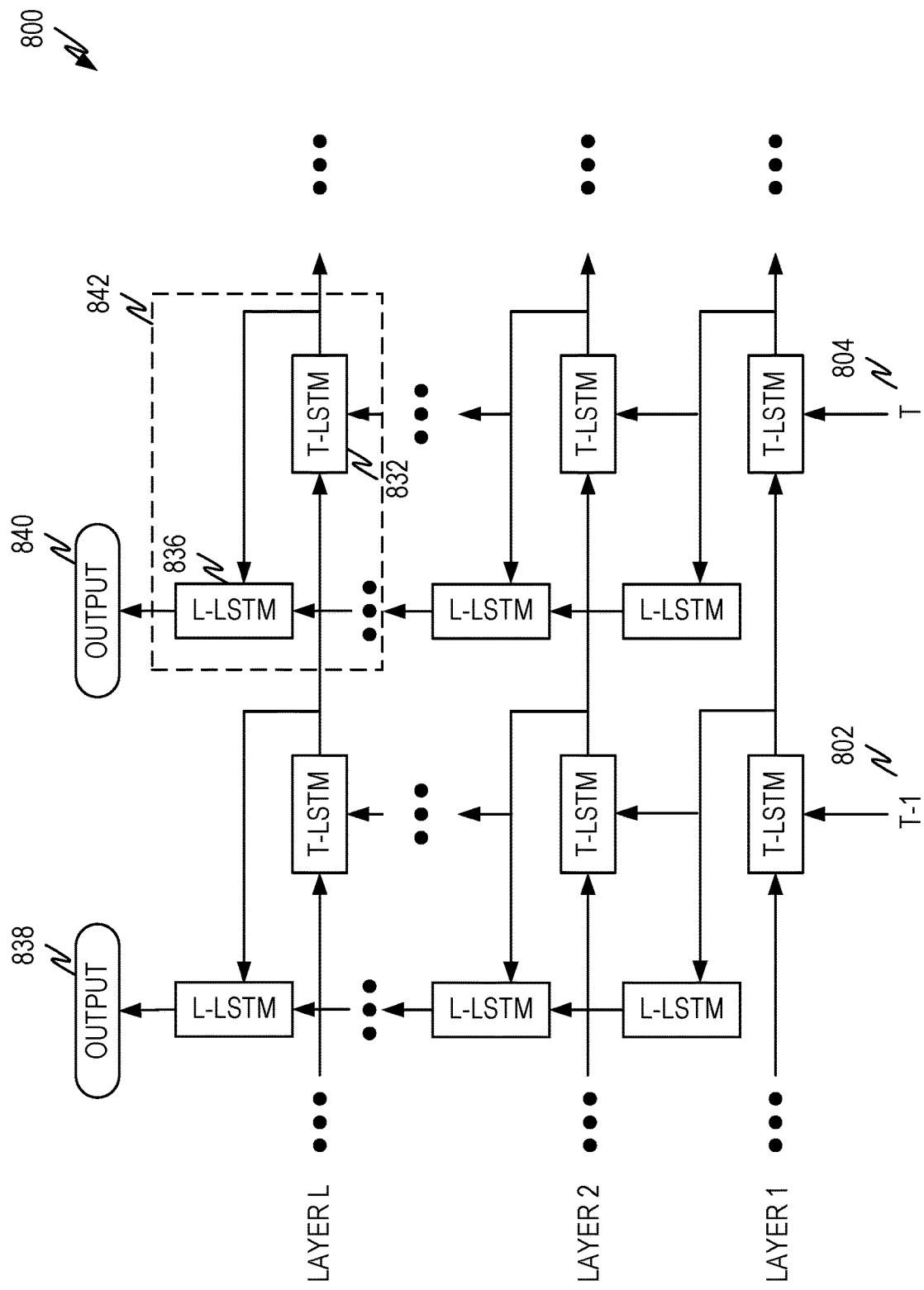
FIG. 8 illustrates a representative architecture for classification according to some aspects of the present disclosure.

FIG. 8 illustrates a representative architecture for classification 800 according to some aspects of the present disclosure. In this embodiment, the function $F(\cdot | \theta_l)$ is realized by LSTM and the time neural network is realized by LSTM.

Thus, each processing block 842 includes a time LSTM unit 832 and a layer LSTM unit 836. The architecture has L layers (layer 1 ... layer L). The output of the final layer LSTM unit is input into an output layer 838, 840 such as a softmax layer to obtain final classification.

The implementation of the time LSTM is given by equations (1)-(6) or (1)-(5) and (8) depending on whether residual LSTM are used.

In this embodiment, the l-th layer of the layer LSTM unit can be expressed as:

$$j_t^l = \sigma(U_{jh}^l h_t^l + U_{jg}^l g_t^{l-1} + q_j^l \odot m_t^{l-1} + d_j^l) \quad (9)$$

$$e_t^l = \sigma(U_{eh}^l h_t^l + U_{eg}^l g_t^{l-1} + q_e^l \odot m_t^{l-1} + d_e^l) \quad (10)$$

$$m_t^l = e_t^l \odot m_t^{l-1} + j_t^l \odot \phi(U_{sh}^l h_t^l + U_{sg}^l g_t^{l-1} + d_s^l) \quad (11)$$

$$v_t^l = \sigma(U_{vh}^l h_t^l + U_{vg}^l g_t^{l-1} + q_v^l \odot m_t^l + d_v^l) \quad (12)$$

$$g_t^l = v_t^l \odot \phi(m_t^l) \quad (13)$$

The vectors $j_t^l$, $v_t^l$, $e_t^l$, $m_t^l$, are the activation of the input, output, forget gates, and memory cells of the layer LSTM, respectively. $g_t^l$ is the output of the layer LSTM. The matrices $U_{\cdot h}^l$ and $U_{\cdot g}^l$ are the weight matrices for the inputs $h_t^l$ and the recurrent inputs $g_t^{l-1}$, respectively. $d^l$ are the bias vectors. $q_j^l$, $q_v^l$, $q_e^l$, are parameter vectors associated with peephole connections. The functions $\sigma(\cdot)$ and $\phi(\cdot)$ are the logistic sigmoid and hyperbolic tangent nonlinearity, respectively. The operation $\odot$ represents element-wise multiplication vectors.

The biggest difference between equations (1)-(5) and equations (9)-(13) is the recurrence now happens across the layers (weights are not shared) with $g_t^{l-1}$ in the layer LSTM, compared to $g_{t-1}^l$ in the time LSTM. Layer LSTM uses the output of time LSTM at the current layer, $h_t^l$, as the input, compared to $x_t^l$ in the time LSTM. The total computational cost of the classifier is almost doubled due to computing both the time and layer LSTM units, but the computation of the time LSTM units and layer LSTM units can be done in two parallel threads because of the independence between them as explained above. Thus, computational time of the classifier is the same as a classifier without the layer LSTM units from the inference latency perspective.

Figure 9:
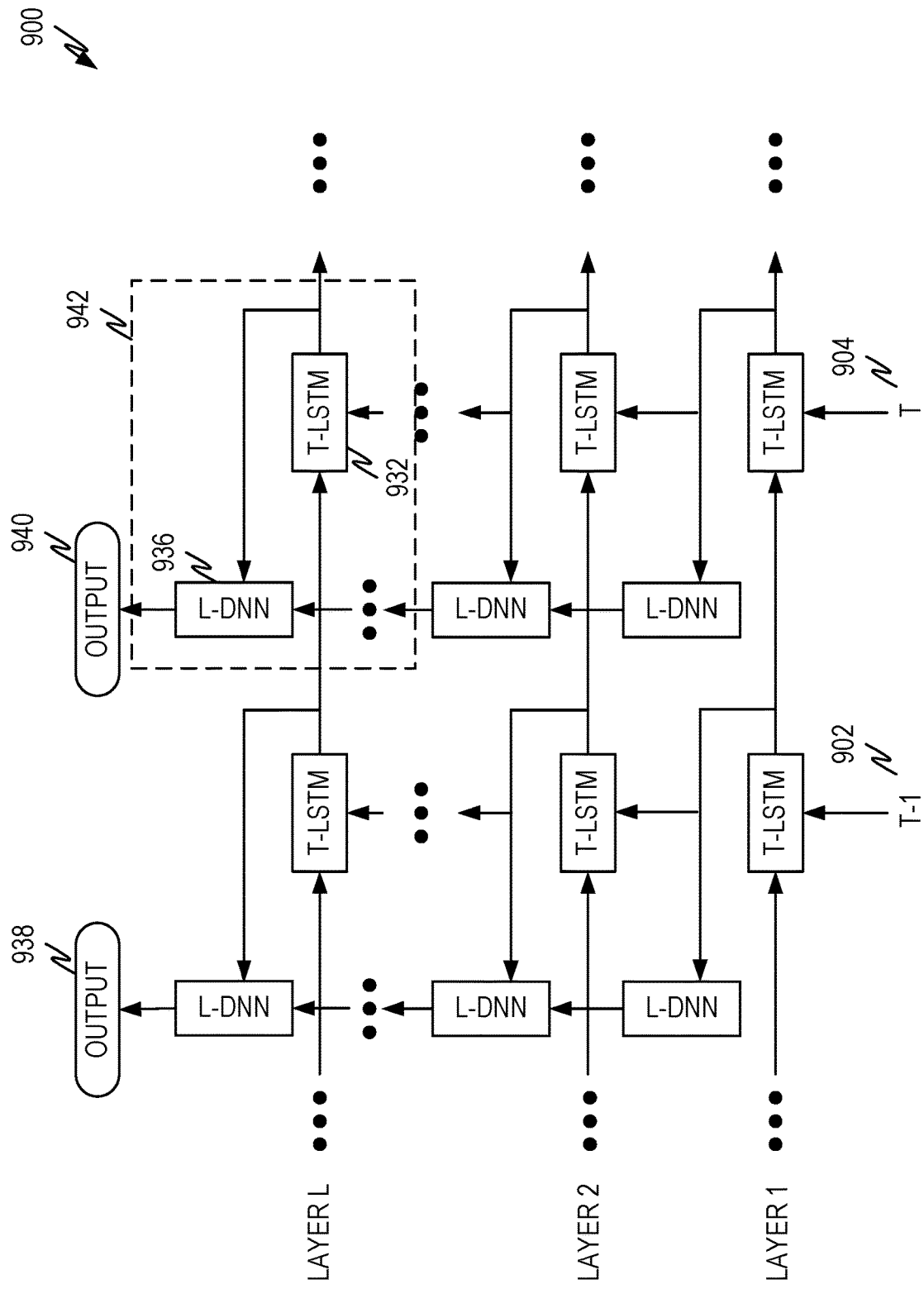
FIG. 9 illustrates a representative architecture for classification according to some aspects of the present disclosure.

FIG. 9 illustrates a representative architecture for classification according to some aspects of the present disclosure. In this embodiment each processing block 942 comprises a time LSTM 932 for the time neural network unit and a layer DNN 936 for the layer neural network unit. The output of the final layer DNN is input into an output layer 938, 940 such as a softmax layer to obtain final classification.

The computational costs of a DNN can be less than the computational costs for an LSTM, so replacing the layer LSTM of FIG. 8 with the layer DNN in FIG. 9 can save on computational costs. This embodiment thus contains a model for runtime-cost constrained applications.

The layer DNNs 936 can be gated DNNs or maxout DNNs. When gated DNNs are used, the layer neural network units can be expressed as:

$$g_t^l = \phi(\sigma(O_h^l h_t^l) \odot U_h^l h_t^l + \sigma(O_g^l g_t^{l-1}) \odot U_g^l g_t^{l-1}) \quad (14)$$

Where $g_t^l$ and $h_t^l$ are hidden states of the l-th layer of the layer neural network unit and the time LSTM unit at time step t, respectively. $\sigma(\cdot)$ is the Sigmoid function that computes the soft gates for $h_t^l$ and $g_t^{l-1}$. $\phi(\cdot)$ denotes the hyperbolic tangent nonlinearity. O and U are weight matrices. The Sigmoid date functions control the contributions from each time LSTM and layer neural network unit during forward and backward computation. Experiments on this structure showed that without the gate functions the model training can diverge easily-a phenomenon of gradient explosion. The two gate functions can mitigate the problem well according to experiments. Compared to the layer-LSTM embodiment of FIG. 8, the embodiment of FIG. 9 has much lower computational cost.

To further reduce computational costs, maxout DNNs can be utilized instead of gated DNNs for the layer neural network units. Maxout DNNs utilize hard [0,1] gates without trainable parameters rather than the soft gates of equation (14). When maxout DNNs are used, the layer neural network units can be expressed as:

$$g_t^l = \phi(\max(U_h^l h_t^l, U_g^l g_t^{l-1})) \quad (15)$$

Where the $\max(\cdot)$ is element-wise max operation after the linear transformation of $h_t^l$ and $g_t^{l-1}$ by weight matrices $U_h^l$ and $U_g^l$, respectively. From experiments, the max operation is helpful to mitigate the gradient explosion problem.

Figure 10:
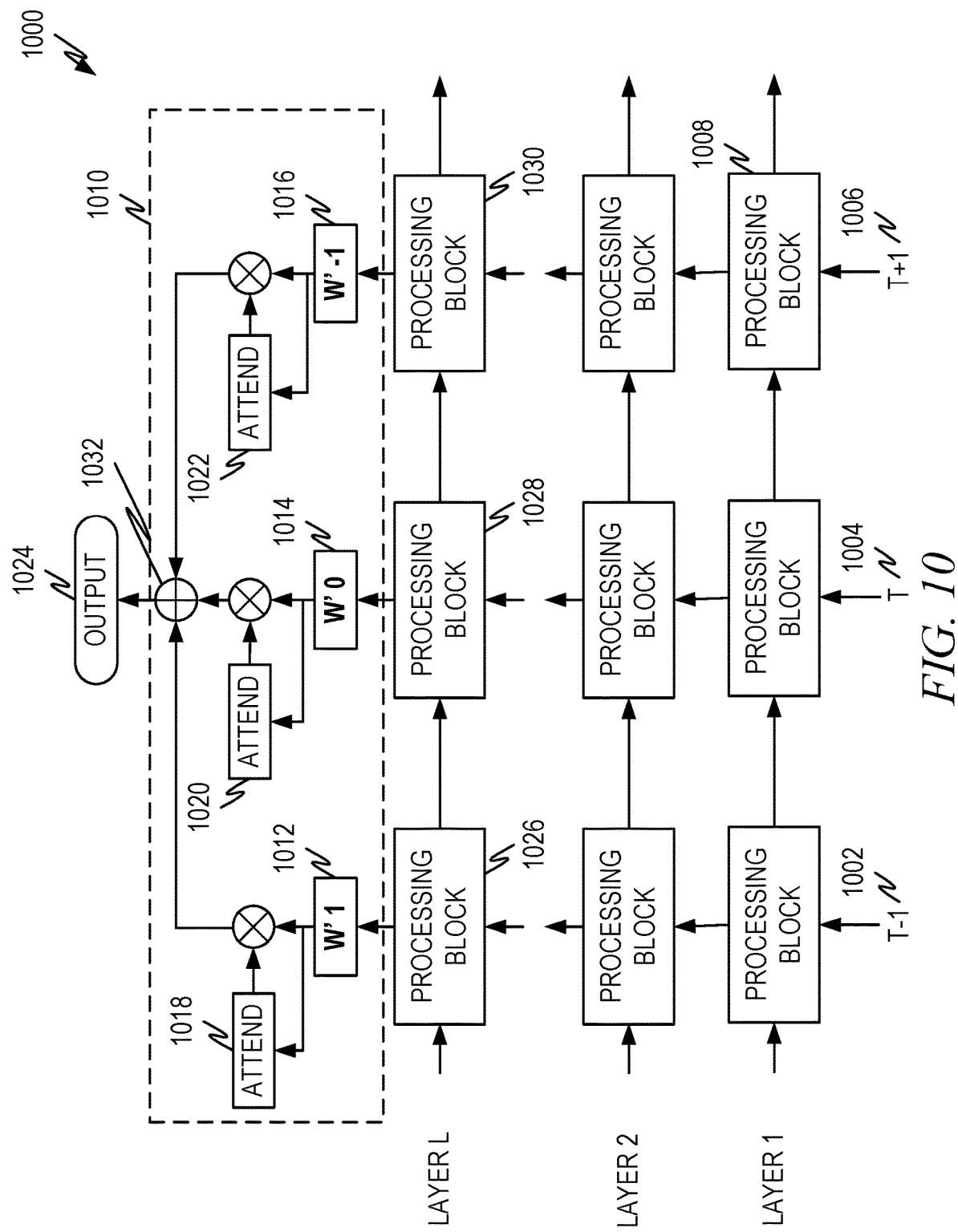
FIG. 10 illustrates a representative architecture for classification with an attention layer according to some aspects of the present disclosure.

FIG. 10 illustrates a representative architecture 1000 for classification with an attention layer 1010 according to some aspects of the present disclosure. A classifier with neural network processing blocks 1008 in any of the embodiments can be coupled with an attention layer 1010. Thus, the embodiments disclosed with layer neural network units that comprise LSTM units, gated DNN units, or maxout DNN units can be modified to include an attention layer 1010. In this embodiment, rather than the top layer neural network unit being coupled directly to an output layer to obtain the final classification, the output of the top layer neural network unit 1026, 1028, 1030 is coupled to the attention layer 1010, the output of which is connected to an output layer 1024 such as a softmax layer to obtain the final classification.

Without the attention layer 1010, the disclosed embodiments use the single $g_t^L$ at the top layer at time step t for frame-by-frame classification. The target of time step t may not be accurate due to time-alignment error. Furthermore, the wide context information may be valuable for frame-level classification, which is evidenced by the strong gain by bi-directional LSTM over its unidirectional counterpart. To incorporate the information from contextual frames, $g_\delta^L$ is transformed in the context window for each $\delta \in [t-\tau, t+\tau]$ as:

$$r_\delta = W'_{t-\delta} g_\delta^{l-1} \quad (16)$$

Where $r_\delta$ represents the transformed signal at time $\delta$ and $W'_{[-\tau,\tau]}$ are trainable parameters. $r_\delta$ can be averaged in the context window into the context vector $z_t$ for final classification. Thus:

$$z_t = \sum_{\delta=t-\tau}^{t+\tau} (r_\delta^L) \quad (17)$$

$$= \gamma \sum_{\delta=t-\tau}^{t+\tau} (\alpha_{t,\delta}, r_\delta^L) \quad (18)$$

Where $z_t$ represents a special case context vector with uniform attention weights $$\alpha_{t,\delta} = \frac{1}{\gamma},$$

where $\gamma=2\tau+1$. However, higher accuracy may be achieved with the non-uniform attention as in the attention based encoder-decoder network disclosed in Dzmitry Bahdanau, Kyunghyun Cho, and Yoshua Bengio, "Neural machine translation by jointly learning to align and translate," arXiv preprint arXiv.1409.0473, 2014, incorporated herein by reference. The energy signal for attention is defined as:

$$e_{t,\delta} = \tanh(Wr_\delta + Vf_{t-1} + b) \quad (19)$$

Where $f_{t-1} = F * \alpha_{t-1}$. W, V, and F are trainable matrices, b is a bias vector, and the operation * denotes convolution. $\alpha_t$ denotes the combination coefficients for filtered vectors $r_\delta$. The components of $r_\delta$ are defined below in equation (20).

Instead of content-based attention, embodiments of the present disclosure use location based attention with $\alpha_{t-1}$ in which the location information is encoded. Although content-based attention can be employed by using logits to replace the decoder states as queries in the content-based attention.

Equation (19) generates an energy vector for every 5, different from the standard attention mechanism which produces a scalar value by multiplying it with a vector. The system generates column energy vectors $[e_{t,t-\tau}, \ldots, e_{t,t+\tau}]$ where each $e_{t,\delta} \in (-1, 1)^n$ where n is the vector dimension. Let $e_{t,\delta,j} \in (-1, 1)$ be the j-th component of the vector $e_{t,\delta}$. To compute $\alpha_{t,\delta,j}$ from $e_{t,\delta,j}$ the system normalizes $e_{t,\delta,j}$ across $\delta$ keeping j fixed. Thus, $\alpha_{t,\delta,j}$ is computed as:

$$\alpha_{t,\delta,j} = \frac{\exp(e_{t,\delta,j})}{\sum_{\delta'=t-\tau}^{t+\tau} \exp(e_{t,\delta',j})} \text{ for } j = 1, \ldots, n. \quad (20)$$

Here, $\alpha_{t,\delta,j}$ can be interpreted as the amount of contribution from $r_\delta(j)$ in computing $z_t(j)$. Now, the context vector $z_t$ can be computed using:

$$z_t = \gamma \sum_{\delta=t-\tau}^{t+\tau} (\alpha_{t,\delta} \odot r_\delta) \quad (21)$$

Where ⊙ is the Hadamard product. Hence, the method is a dimension-wise location-based attention. In equation (21) $\alpha_{t,\delta}$ is a vector, different from the scalar $\alpha_{t,\delta}$ in equation (18).

To help correlate the above implementation equations to the attention layer 1010, the inputs into the weight operations 1012, 1014, 1016 are expressed as $g_{t-1}^L$, $g_t^L$, $g_{t+1}^L$, respectfully. The outputs of the weight operations 1012, 1014, 1016 are expressed as $r_{t-1}^L$, $r_t^L$, $r_{t+1}^L$, respectfully. The outputs of the attend operation 1018, 1020, 1022 are expressed as $\alpha_{t,t-1}$, $\alpha_{t,t}$, $\alpha_{t,t-1}$, respectfully. The output of the sum operation 1032 is the context vector $z_t$, which it input into the output layer 1024 for final classification.

Experiments were performed using the disclosed embodiments above to ascertain the word error rate (WER) when the embodiments were used for senone classification as part of a speech recognition system, such as the architecture of FIG. 4. Comparisons were made to a standard multi-layer LSTM and residual LSTM classifier without the layer neural network units of the disclosed embodiments. In all experiments, the neural networks were uni-directional and were trained using either using cross-entropy or sequence discriminative training with 30 thousand hours of anonymized and transcribed Microsoft production data. Both cross-entropy training and sequence discriminative training are well known in the art and the process need not be repeated in detail here.

The production data consisted of Cortana and Conversation data and was recorded in both close-talk and far-field conditions. All LSTM modules use 1024 hidden units and the output of each LSTM layer is reduced to 512 using a linear projection layer. The output softmax layer has 9404 nodes to model the senone labels. The target label is delayed by 5 frames. The input feature is an 80-dimension log Mel filter bank. Frame skipping was applied to reduce run-time cost. The language model is a 5-gram with around 100 million n-grams.

The results for the cross-entropy trained models is presented in Table 1. The Cortana data set has 439 thousand words and the Conversation data set has 111 thousand words. The Cortana data set has shorter utterances related to voice search and commands. The Conversation data set has longer utterances from conversations. The DMA data set is an evaluation data set having 29 thousand words and was not seen by the models during training. It serves to evaluate the generalization capacity of the models.

TABLE 1

WER (percentage) of Models

| Classifier Model | Cortana | Conversation | DMA |
|---|---|---|---|
| 4-layer LSTM | 10.37 | 19.41 | 20.66 |
| 6-layer LSTM | 9.85 | 19.20 | 20.19 |
| 10-layer LSTM | 10.58 | 19.92 | 21.62 |
| 6-layer Residual LSTM | 9.99 | 18.85 | 19.49 |
| 10-layer Residual LSTM | 9.68 | 18.15 | 18.62 |
| 12-layer Residual LSTM | 9.59 | 18.19 | 18.78 |
| 6-layer L-LSTM (FIG. 8) | 9.28 | 17.47 | 17.61 |
| 6-layer L-gated DNN (FIG. 9) | 9.63 | 17.87 | 18.63 |
| 6-layer L-maxout DNN (FIG. 9) | 9.77 | 18.26 | 18.90 |
| 6-layer L-LSTM with attention (FIG. 8 & 10) | 8.96 | 17.22 | 16.57 |
| 6-layer L-gated DNN with attention (FIG. 9 & 10) | 9.25 | 17.68 | 17.76 |

All of the 6-layer models of the present disclosure outperformed the prior-art 6-layer models in terms of word error rates. For the attention layer, $\tau$ was set to be 4. Larger $\tau$ may be beneficial to accuracy, but it introduces larger latency and so was not tested. It is interesting to note that the attention layer had the most relative improvement on the DMA data set which was not seen during training.

The results of sequence discriminative trained models is presented in Table 2. For the sake of runtime performance, Single Value Decomposition (SVD) compression was first performed to all the weight matrices before sequence training using the MMI criteria and with F-smoothing as described in Hang Su, Gang Li, Dong Yu, and Frank Seide, "Error back propagation for sequence training of context-dependent deep networks for conversational speech transcription," in Acoustics, Speech and Signal Processing (ICASSP), 2013 IEEE International Conference on. IEEE, 2013, pp. 6664-6668.

TABLE 2

WER of Sequence Discriminative Trained Models

| Classifier Model | Cortana | Conversation | DMA |
|---|---|---|---|
| 6-layer LSTM | 7.93 | 19.17 | 17.45 |
| 6-layer L-LSTM (FIG. 8) | 7.29 | 17.24 | 15.80 |
| 6-layer L-gated DNN (FIG. 9) | 7.48 | 17.77 | 15.52 |

Table 3 compares the total computational cost of all models. Both 6-layer LSTM and 6-layer residual LSTM models have 26M (million) operations for hidden time LSTM evaluation and 5M operations for softmax evaluation per frame, resulting in 31M total operations per frame.

The 6-layer L-LSTM almost doubles the total computational cost of the 6-layer LSTM, with 57M total operations per frame, which is the same as the computational cost of the 12 layer residual LSTM models, although the time to compute a frame can be the same as the regular 6-layer LSTM model due to the ability of running the time and layer computations in a separate thread, as previously explained. Th 6-layer L-gated DNN significantly reduces computational cost from the 6-layer L-LSTM model with 37M operations per frame. The 6-layer L-maxout DNN has even smaller computational costs. Furthermore, the attention layer only slightly increases the computational cost from their counterparts, while SVD compression significantly reduces the model size and computation. The SVD version of the models half the computational cost of the full-size counterparts.

| Classifier Model | Total Computational Cost (M) |
| --- | --- |
| 4-layer LSTM | 22 |
| 6-layer LSTM | 31 |
| 10-layer LSTM | 49 |
| 6-layer Residual LSTM | 31 |
| 10-layer Residual LSTM | 49 |
| 12-layer Residual LSTM | 57 |
| 6-layer L-LSTM (FIG. 8) | 57 |
| 6-layer L-gated DNN (FIG. 9) | 37 |
| 6-layer L-maxout DNN (FIG. 9) | 33 |
| 6-layer L-LSTM with attention (FIG. 8 & 10) | 59 |
| 6-layer L-gated DNN with attention (FIG. 9 & 10) | 39 |
| 6-layer SVD compression LSTM | 16 |
| 6-layer SVD compression L-LSTM | 29 |
| 6-layer SVD compression L-gated DNN | 19 |

Example Machine Architecture and Machine-Readable Medium

Figure 11:
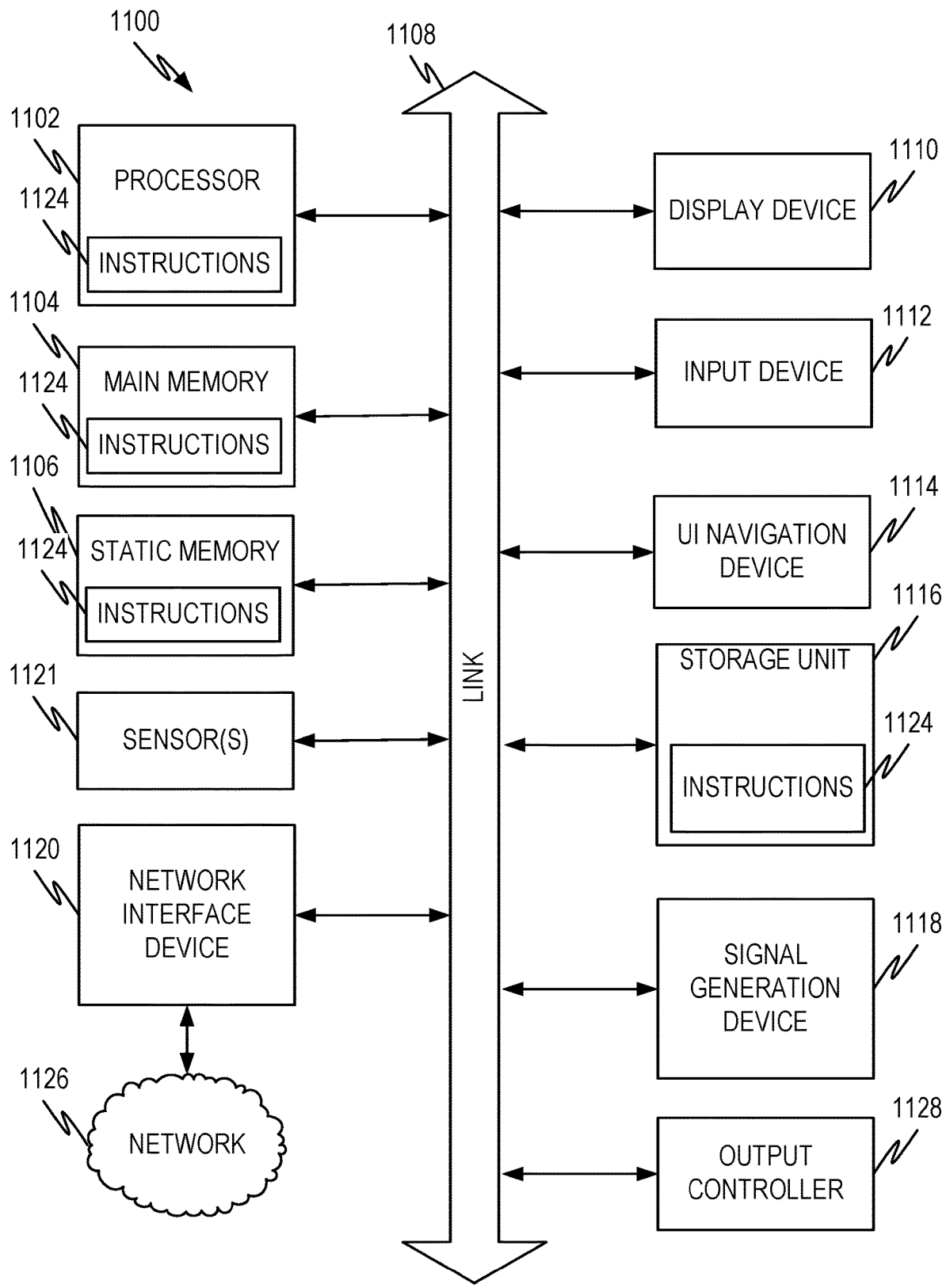
FIG. 11 illustrates a representative machine architecture suitable for implementing the systems and other aspects disclosed herein or for executing the methods disclosed herein.

FIG. 11 illustrates a representative machine architecture suitable for implementing the systems and other aspects disclosed herein or for executing the methods disclosed herein. The machine of FIG. 11 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), an eye tracking subsystem, and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Rather than the more conventional microprocessor, Neural Network chips can be used to implement embodiments of the present disclosure. Neural Network chips are specialized chips designed to execute various forms of neural networks. As such, they are suitable for use in implementing aspects of the present disclosure such as the source separators 910 and other neural network aspects of the present disclosure. Based on the disclosure contained herein, those of skill in the art will know how to implement the embodiments of the present disclosure using one or more neural network chips.

Additionally, beamformers (e.g., beamformer 906) and microphone arrays (e.g., microphone array 904) are often implemented in whole or in part using discrete circuitry or specialized circuitry tailored to the design. This is particularly true where fixed beamformers such as those discussed that form beams at 30 degree offsets from each other are utilized with an appropriate array microphone. These are all suitable for implementation of embodiments of the present disclosure and those of skill in the art will understand how to implement embodiments of the present disclosure based on the disclosure contained herein.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, communication mechanisms, and other such transitory media, at least some of which are covered under the term "signal medium" discussed below.

Signal Medium

The term "signal medium" shall betaken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1. A system comprising:
a trained machine learning classifier having an input to receive an input signal at a first time step and an output to output a classified posterior at the first time step, the trained machine learning classifier comprising a plurality of processing blocks arranged in a plurality of layers, each processing block comprising.
a time processing block connected so that the output at one time step is input into the time processing block at a next time step, the time processing block comprising a recurrent neural network; and
a layer processing block connected so that the output of one layer is input to a layer processing block at a next higher layer, a layer processing block at a bottom layer receiving the input signal to the time processing block at the bottom layer, a top layer processing block output being connected to an output layer;
the output layer outputting the classified posterior; and
the input signal comprising at least one of speech data, audio data, handwriting data, or textual data.

Example 2. The system of claim 1 wherein the recurrent neural network is an LSTM network.

Example 3. The system of claim 1 wherein the layer processing block is a gated DNN.

Example 4. The system of claim 1 wherein the layer processing block is a maxout DNN.

Example 5. The system of claim 1 further comprising:
an attention layer between the top layer processing block and the output layer.

Example 6. The system of claim 2 further comprising:
an attention layer between the top layer processing block and the output layer.

Example 7. The system of claim 3 further comprising:
an attention layer between the top layer processing block and the output layer.

Example 8. The system of claim 4 further comprising:
an attention layer between the top layer processing block and the output layer.

Example 9. A computer implemented method, comprising:
receiving an input signal comprising at least one of handwriting data, speech data, audio data, or textual data;
sending the received input signal to a trained machine learning model, the trained machine learning model comprising:
a plurality of time layers, each time layer comprising a recurrent neural network processing block;
a depth processing block that scans the hidden states of the recurrent neural network processing block of each time layer; and
an output layer that outputs a final classification; and
receiving from the trained machine learning model the final classification comprising a classified posterior of the input signal.

Example 10. The method of claim 9 wherein the input signal is speech data and the output is at least one senone posterior.

Example 11. The method of claim 10 further comprising:
sending the at least one senone posterior to a word hypothesis decoder having a language model; and
receiving from the decoder recognized speech corresponding to at least a portion of the speech data.

Example 12. The method of claim 9 wherein the depth processing block comprises a plurality of LSTM processing blocks, one corresponding to each time layer.

Example 13. The method of claim 9 wherein the depth processing block comprises a plurality of gated DNN processing blocks, one corresponding to each time layer.

Example 14. The method of claim 9 wherein the depth processing block comprises a plurality of maxout DNN processing blocks, one corresponding to each time layer.

Example 15. The method of claim 9 further comprising an attention layer between the depth processing block and the output layer.

Example 16. A computer implemented method, comprising:
receiving an input signal comprising at least one of handwriting data, speech data, audio data, or textual data;
sending the received input signal to a trained machine learning model, the trained machine learning model comprising a plurality of processing blocks arranged in a plurality of layers, each processing block comprising:
a time processing block connected so that the output at one time step is input into the time processing block at a next time step, the time processing block comprising a recurrent neural network; and
a layer processing block connected so that the output of one layer is input to a layer processing block at a next higher layer, a layer processing block at a bottom layer receiving the input signal to the time processing block at the bottom layer, a top layer processing block output being connected to an output layer;
the output layer outputting the classified posterior; and
receiving from the trained machine learning model the classified posterior of the input signal from the output layer.

Example 17. The method of claim 16 wherein the input signal is speech data and the output is a senone posterior.

Example 18. The method of claim 17 further comprising:
sending the senone posterior to a word hypothesis decoder having a language model; and
receiving from decoder recognized speech corresponding to at least a portion of the speech data.

Example 19. The method of claim 16 wherein the input signal is handwriting data and the output is a classified posterior.

Example 20. The method of claim 19 further comprising:
sending the classified posterior to a word hypothesis decoder having a language model; and
receiving from the decoder recognized handwriting corresponding to at least a portion of the handwriting data.

Example 21. The method of claim 16 wherein the input signal is audio data and the output is a classified posterior.

Example 22. The method of claim 6 further comprising:
sending the classified posterior to a decoder adapted to recognize different classified posteriors; and
receiving from the decoder recognized audio components corresponding to at least a portion of the audio data.

Example 23. The system of claim 16, 17, 18, 19, 20, 21 or 22 wherein the recurrent neural network is an LSTM network.

Example 24. The system of claim 16, 17, 18, 19, 20, 21 or 22 wherein the layer processing block is a gated DNN.

Example 25. The system of claim 16, 17, 18, 19, 20, 21 or 22 wherein the layer processing block is a maxout DNN.

Example 26. The system of claim 16, 17, 18, 19, 20, 21, 22, 23, 24 or 25 further comprising:
an attention layer between the top layer processing block and the output layer.

Example 27. An apparatus comprising means to perform a method as claimed in any preceding claim.

Example 28. Machine-readable storage including machine-readable instructions, when executed, to implement a method or realize an apparatus as claimed in any preceding claim.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer-implemented method for performing speech recognition, the method comprising:
providing computer-readable speech data to a computer-implemented model that has been trained to recognize words in speech, wherein the computer-readable speech data encodes a spoken utterance that includes a word, and further wherein the computer-implemented model comprises:
a first hidden layer, wherein the first hidden layer includes a first time processing block and a first layer processing block;
a second hidden layer, wherein the second hidden layer includes a second time processing block and a second layer processing block, wherein the second time processing block is configured to receive output of the first time processing block, wherein the first layer processing block is configured to receive output of the first time processing block, and further wherein the second layer processing block is configured to receive output of the first layer processing block and output of the second time processing block; and
an output layer that includes an output node that is configured to generate an output based upon output of the second layer processing block; and
assigning a label to the computer-readable speech data based upon the output associated with the output node of the computer-implemented model, wherein the label is indicative of the word in the spoken utterance.

2. The computer-implemented method of claim 1, wherein the first hidden layer additionally comprises a third time processing block and a third layer processing block, wherein the third time processing block is configured to receive output of the first time processing block, and further wherein the third layer processing block is configured to receive output of the third time processing block.

3. The computer-implemented method of claim 2, wherein first time processing block, the first layer processing block, the second time processing block, and the second layer processing block are associated with a first time step, and further wherein the third time processing block and the third layer processing block are associated with a second time step that is subsequent the first time step.

4. The computer-implemented method of claim 3, wherein the output layer includes a second output node that is configured to generate an output based upon output of the third layer processing block, wherein the label assigned to the computer-readable speech data is based upon the output generated by the second output node of the computer-implemented model.

5. The computer-implemented method of claim 1, wherein the first layer processing block and the second layer processing block are recurrent neural networks.

6. The computer-implemented method of claim 5, wherein the recurrent neural networks are long short-term memory (LSTM) networks.

7. The computer-implemented method of claim 1, wherein the computer-implemented model additionally includes an attention layer that is positioned between the second hidden layer and the output layer.

8. The computer-implemented method of claim 1, wherein the label identifies a senone from amongst numerous potential senones.

9. The computer-implemented method of claim 1, wherein the first time processing block and the second time processing block are recurrent neural networks.

10. The computer-implemented method of claim 1, wherein the output of the first layer processing block is not provided as input to the first time processing block.

11. The computer-implemented method of claim 1, wherein the output is a senone, further comprising:
sending the label to a word hypothesis decoder having a language model; and
receiving from the decoder the word included in the spoken utterance, wherein the decoder identifies the word based upon the label.

12. A computing system comprising:
a processor; and
memory storing instructions that, when executed by the processor, cause the processor to perform acts comprising:
providing computer-readable speech data to a computer-implemented model that has been trained to recognize words in speech, wherein the computer-readable speech data encodes a spoken utterance that includes a word, and further wherein the computer-implemented model comprises:
a hidden layer that comprises a first layer processing block, a second layer processing block, a first time processing block, and a second time processing block, wherein the first layer processing block and the first time processing block correspond to a first time step, wherein the second layer processing block and the second time processing block correspond to a second time step that is subsequent the first time step, wherein output of the first time processing block is received as input to the first layer processing block and the second time processing block, and further wherein output of the second time processing block is received as input to the second layer processing block; and an output layer that includes a first output node and a second output node, wherein the first output node is configured to receive output of the first layer processing block and the second output node is configured to receive output of the second layer processing block, and further wherein the first output node is associated with a first output and the second output node is associated with a second output;

assigning a label to the computer-readable speech data based upon the first output and the second output, wherein the label is indicative of the word in the spoken utterance.

13. The computing system of claim 12, wherein the computer-implemented model further comprises a second hidden layer that is beneath the hidden layer in the computer-implemented model, wherein the hidden layer is configured to receive outputs of the second hidden layer.

14. The computing system of claim 13, wherein the second hidden layer comprises a third layer processing block and a third time processing block, wherein the third layer processing block and the third time processing block are associated with the first time step, wherein the first layer processing block is configured to receive output of the third layer processing block, and further wherein the first time processing block is configured to receive output of the third time processing block.

15. The computing system of claim 14, wherein the third layer processing block is configured to receive the output of the third time processing block, wherein the output of the third layer processing block is based upon the output of the third time processing block.

16. The computing system of claim 12, wherein the first layer processing block and the second layer processing block are recurrent neural networks.

17. The computing system of claim 16, wherein the recurrent neural networks are long short-term memory (LSTM) networks.

18. The computing system of claim 12, wherein the computer-implemented model additionally includes an attention layer.

19. The computing system of claim 12, wherein the label identifies a senone from amongst numerous potential senones.

20. A computer storage medium that stores instructions that, when executed by a processor, cause the processor to perform acts comprising:

providing computer-readable speech data to a computer-implemented model that has been trained to recognize words in speech, wherein the computer-readable speech data encodes a spoken utterance that includes a word, and further wherein the computer-implemented model comprises:

a first hidden layer, wherein the first hidden layer includes a first time processing block and a first layer processing block;

a second hidden layer, wherein the second hidden layer includes a second time processing block and a second layer processing block, wherein the second time processing block is configured to receive output of the first time processing block, wherein the first layer processing block is configured to receive output of the first time processing block, and further wherein the second layer processing block is configured to receive output of the first layer processing block and output of the second time processing block; and an output layer that includes an output node that is configured to generate an output based upon output of the second layer processing block; and assigning a label to the computer-readable speech data based upon the output associated with the output node of the computer-implemented model, wherein the label is indicative of the word in the spoken utterance.

* * * * *